United States Patent
Nargiello et al.

(10) Patent No.: US 6,193,795 B1
(45) Date of Patent: Feb. 27, 2001

(54) LOW STRUCTURE PYROGENIC HYDROPHILIC AND HYDROPHOBIC METALLIC OXIDES, PRODUCTION AND USE

(75) Inventors: Maria R. Nargiello, Akron; Gary J. Bush, Seville; Sturgis G. Allen, Akron, all of OH (US)

(73) Assignee: Degussa Corporation, Ridgefield, NJ (US)

( * ) Notice: Subject to any disclaimer, the term of this patent is extended or adjusted under 35 U.S.C. 154(b) by 0 days.

(21) Appl. No.: 08/235,699

(22) Filed: Apr. 29, 1994

Related U.S. Application Data

(63) Continuation-in-part of application No. 08/100,367, filed on Aug. 2, 1993, now abandoned.

(51) Int. Cl.$^7$ .............................. C09C 1/28; C09C 1/36; C09C 1/40
(52) U.S. Cl. .................. 106/484; 106/437; 106/438; 106/439; 106/442; 106/446; 106/450; 106/481; 106/482; 106/483; 241/5
(58) Field of Search .................... 106/437, 438, 106/439, 442, 446, 450, 481, 482, 483, 484; 241/5

(56) References Cited

U.S. PATENT DOCUMENTS

| | | | |
|---|---|---|---|
| 3,126,293 | * 3/1964 | McSheehy et al. | 106/484 |
| 3,317,145 | 5/1967 | Stephanoff | 241/5 |
| 3,622,084 | * 11/1971 | Ross | 241/5 |
| 3,948,676 | 4/1976 | Lauefer | 106/481 |
| 3,954,945 | 5/1976 | Lange et al. | 423/336 |
| 4,067,954 | 1/1978 | Völling | 423/336 |
| 4,068,024 | 1/1978 | Lauefer | 427/220 |
| 4,147,760 | 4/1979 | Kratel et al. | 423/336 |
| 4,190,632 | 2/1980 | Achenbach | 423/118 |
| 4,208,316 | 6/1980 | Nauroth et al. | 524/789 |
| 4,224,295 | 9/1980 | Brandt et al. | 423/355 |
| 4,233,199 | * 11/1980 | Abolins et al. | 524/139 |
| 4,273,589 | 6/1981 | Nauroth | 106/482 |
| 4,276,274 | 6/1981 | Heckel | 423/336 |
| 4,307,023 | 12/1981 | Ettlinger et al. | 524/268 |
| 4,308,074 | 12/1981 | Nauroth | 106/466 |
| 4,360,388 | 11/1982 | Nauroth et al. | 106/482 |
| 4,427,450 | * 1/1984 | Kostansek | 106/484 |
| 4,495,167 | 1/1985 | Nauroth et al. | 423/339 |
| 4,615,741 | 10/1986 | Kobayashi et al. | 106/482 |
| 4,693,427 | * 9/1987 | Bilimoria et al. | 241/23 |
| 4,770,214 | 9/1988 | Ginter et al. | 141/5 |
| 4,857,289 | 8/1989 | Nauroth et al. | 423/339 |
| 4,877,595 | 10/1989 | Klingle et al. | 423/335 |
| 5,261,956 | 11/1993 | Dunaway et al. | 106/416 |

OTHER PUBLICATIONS

*Perry's Chemical Engineers' Handbook,* 6th ed., p. 8–32, 33, 1984, TP151.P45.*

Herbst, J.A., et al., "Fundamentals of fine and ultrafine grinding in a stirred ball mill", published in the Proceedings of The Powder and Bulk Solids Handling Conference, Chicago, Illinois, 1978.

Perry's Chemical Engineers' Handbook, 6th ed., McGraw Hill, New York, 1984, p. 8–34. TP151.P45, Dec. 1984.*

* cited by examiner

Primary Examiner—Mark L. Bell
Assistant Examiner—Michael J. DiVerdi
(74) Attorney, Agent, or Firm—Smith Gambrell & Russell, LLP

(57) ABSTRACT

A method of producing a low structure pyrogenic metal oxide filler is disclosed. The method involves subjecting pyrogenically produced metal oxide agglomerates and aggregates selected from silicon oxide, aluminum oxide, zirconium oxide, or titanium oxide to a dry milling process whereby the pyrogenically produced metal oxide is contacted in an agitating zone with an energy specific force.

16 Claims, 1 Drawing Sheet

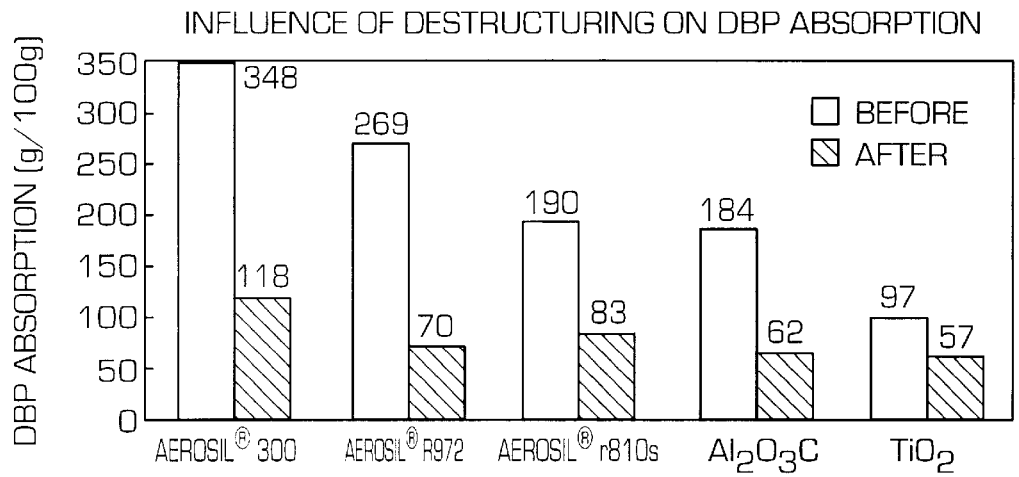
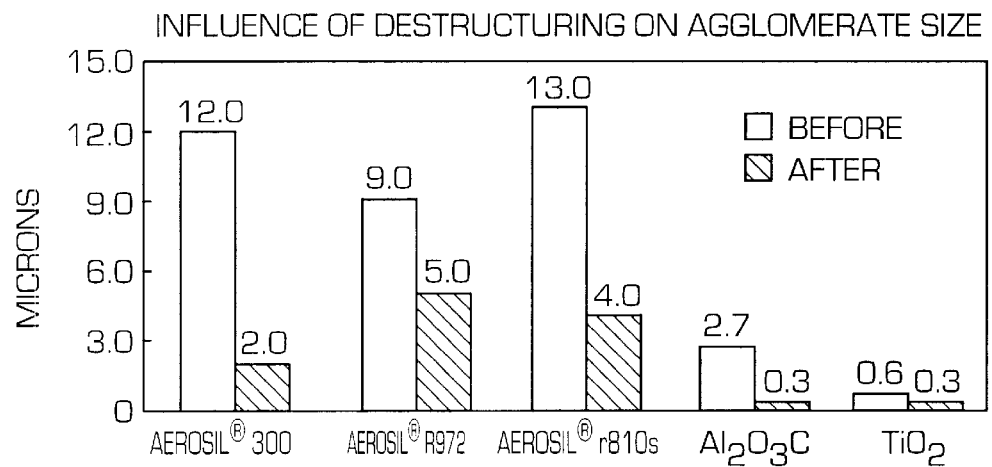
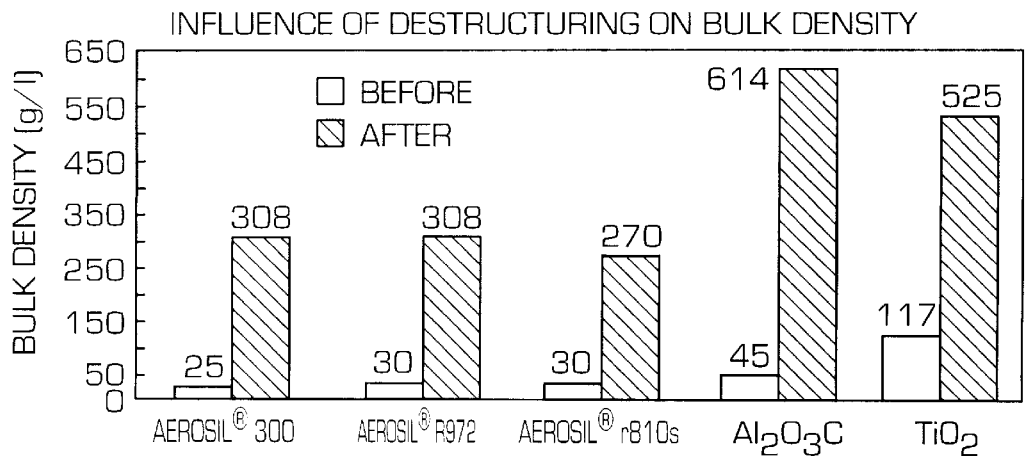

LOW STRUCTURE PYROGENIC HYDROPHILIC AND HYDROPHOBIC METALLIC OXIDES, PRODUCTION AND USE

REFERENCE TO A RELATED APPLICATION

This is a continuation-in-part of our copending application Ser. No. 08/100,367 filed Aug. 2, 1993, abandoned, which is relied on and incorporated herein by reference.

BACKGROUND OF THE INVENTION

The present invention relates to low structure pyrogenic metal oxide fillers and to a method of producing such low structure pyrogenic metal oxide fillers. In a further aspect, the present invention also relates to products made from and containing the novel low structure pyrogenic metal oxide fillers.

Hydrophilic/hydrophobic pyrogenically produced metallic oxides based on silicon, aluminum, zirconium and titanium are well known in the art. They are produced by various methods known in the art such as described in U.S. Pat. Nos. 3,954,945, 4,067,954, and 4,276,274 assigned to the assignee herein and all relied on and incorporated by reference in their entirety. Also known from the prior art is the fact that such oxides are used as reinforcing fillers in many silicone RTV/HTV/LTV and nonsilicone based polymeric formulations such as rubbery polymers, sealants, caulks and adhesives. A full description of silicone rubber chemistry is found in U.S. Pat. No. 4,307,023 (which is incorporated by reference in its entirety, especially column 1, lines 5–30). The highest loadings possible are desired to obtain maximum reinforcement and improved physical properties including improved tensile strength, higher modulus, improved Shore A hardness and higher extrusion rates. Methods of producing hydrophobic pyrogenically obtained metallic oxide particulates are also well known in the art, as shown in U.S. Pat. Nos. 4,068,024 and 3,948,676 both assigned to the assignee herein.

The current problem when using pyrogenic metallic oxides is their high structure, measured by DBP Absorption, which prevents high filler loadings and causes excessive viscosity build-up and low extrusion rates which makes formulations difficult to handle and process. "Structure" as it relates to fillers is a well recognized and understood term, see Kirk Othmer Encyclopedia of Chemical Technology, volume 4, page 638.

Well known processes have been established to reduce particle/aggregate size and to decrease bulk density. However, simultaneously reducing particle size/aggregate size, increasing bulk density and destructuring of pyrogenically produced metallic oxides is, prior to the present invention, an unknown process.

An object of the present invention is to provide low structure or destructured pyrogenic hydrophilic and hydrophobic metallic oxides which allow for higher loadings in formulations whereby excessive viscosity build-up is drastically reduced, extrusion rates are significantly increased, and mechanical properties are improved. Such low structure or destructured pyrogenic hydrophilic and hydrophobic metallic oxides can also be utilized as fillers and carriers for non-polymer applications such as catalysts, refractories, ceramics, and others. Mechanical destructuring is a irreversible process.

SUMMARY OF THE INVENTION

Disclosed is a method of producing a low structure pyrogenic metal oxide filler; i.e., a pyrogenic metal oxide filler of reduced structure compared with the filler prior to being subjected to the method of the invention. The method involves subjecting pyrogenically produced metal oxide agglomerates and aggregates such as silicon oxide, aluminum oxide, zirconium oxide or titanium oxide to a dry milling process whereby the pyrogenically produced metal oxide is contacted in an agitating zone with an energy specific force created by certain reaction conditions.

The term "dry" as used herein means an extremely low moisture content. This is a condition known in the art as a "non-fluid medium" or a "non-fluid mill base". Since the pyrogenic methods of preparation of these metallic oxides do not involve an aqueous system, the products obtained are dry, and any moisture picked up would be adsorbed from the environment. In general, as used herein, the term "dry" means silicon dioxide having less than 2.5% moisture; aluminum oxide having less than 3% moisture; zirconium oxide having less than 1% moisture; and titanium oxide having less than 2% moisture.

The dry grinding process of the present invention is an intensive milling process which goes beyond standard particle size reduction to achieve destructuring of pyrogenic metallic oxides.

Agitating media bed used according to the invention are selected from stainless steel, chrome steel, carbon steel, ceramic, aluminum oxide, tungsten carbide, zirconium carbide, zirconium oxide, or zirconium silicate whereby the metallic oxide agglomerates and aggregates are free to move, collide and impinge between the colliding media. The media is kept in constant agitation by a rotating shaft with protruding extensions of a desired length or by a rolling drum. The media diameter is generally one quarter inch to one inch in diameter and being of circular, spherical or cylindrical shape (or equivalents thereof). The shaft speed is between 100 and 1500 rpm or the roller drum speed is between 30 to 120 rpm. It is a feature of the invention that the media fills the volume of the agitating zone to the extent of ¼ to ¾ of the total volume and wherein the dwell time in the zone is controlled by the amount of time the metallic oxide remains in the media bed or by the number of passes through the media bed. The product stream is evaluated to ascertain the structure of the resulting product until a steady state condition is reached. The lowering of the structure of the pyrogenic metallic oxide is a function of the time of compression, the amount of compressive force exerted on the aggregate/agglomerate particles and the conditions of compression.

BRIEF DESCRIPTION OF THE DRAWINGS

The invention will be further understood with reference to the drawings, wherein:

FIG. 1 is a bar chart showing the influence of destructuring on DBP absorption;

FIG. 2 is a bar chart showing the influence of destructuring on agglomerate size; and FIG. 3 is a bar chart showing the influence of destructuring on bulk density.

DETAILED DESCRIPTION OF THE INVENTION

According to the present invention, reduced particle/aggregate size, extremely increased bulk density and destructured products are manufactured by taking hydrophilic/hydrophobic pyrogenic metallic oxides and passing them through a dry milling process whereby the products come into contact with a energy specific force created by the following conditions:

Agitating media (specific density 2.3–8 g/cm³, examples include stainless or chrome or carbon steel, ceramic, tungsten or zirconium carbide, zirconium oxide or zirconium silicate) so that the metallic oxide agglomerates/aggregates are free to move, collide and impinge upon each other.

Media is kept in constant agitation by a stationary shaft (vertical or horizontal) with protruding extensions of a length determined by the size of the vessel or by a rolling drum.

The media diameter is 0.04–1 inch in diameter.

The media can be either spherical, cylindrical or other shapes used in the art.

The shaft speed must be between 100–1500 rpm or the rpm of the rolling drum must be between 30–120 rpm.

At rest, the media used must fill ¼–¾ of the volume of the chamber or vessel used for destructuring.

The stationary rotating shaft refers to a shaft whose only motion is its rotation about its axis. The protruding extensions of the stationary shaft are of varying lengths which achieve fluidization of the media.

Time is very important in the process of the present invention because destructuring takes place after a critical reduced particle/aggregate size and increased bulk density have been achieved. The dwell time where the pyrogenic metallic oxide is in contact with the agitating media is controlled by either:

1. the amount of time the metallic oxide remains in the media bed or
2. by the number of passes through the media bed.

Examples of these mills include ball mills, attrition mills, and others known in the art. Destructuring is also accomplished by intense compression through a roller mechanism, whereby, for example, the silica is compressed upon itself, between roller devices or between roller devices and a stationary vessel wall. An example of these types is a roller mill (i.e., 2-roll mill or 3-roll mill) and others known in the art.

A correctly operating mill such as a ball mill is characterized by a typical movement traveled by a typical ball in a partially filled ball mill chamber. Low velocity of the ball mill causes the typical ball inside the mill to be gradually lifted up on one side of the mill to a higher and higher level. At that point the ball cascades, falling and tumbling down along the sloping surface to the low side of the mill. Three types of movements are recognized in connection with operating ball mills; namely, centrifuging, cataracting and cascading. These characteristic actions in a ball mill are known and recognized in the art. The desirable movement is cascading and persons skilled in the art recognize what is meant by this term. Cascading is a highly efficient process for producing a finely divided material and is the goal of the successful operation of the invention.

Charging the ball mill or attrition mill to a partial capacity, such as halfway, provides the most efficient loading arrangement. Optimum loading complies with theoretical considerations and cascading freely occurs throughout the mill.

Ceramic ball media, such as flint pebbles and porcelain balls, were historically supplied in a range of sizes as indicated above. Steel balls and other newer technology types as known in the art are commonly supplied in ball diameters which also can vary, but in accordance with the present invention it has been found that dimensions of 0.04 inch to 1 inch diameter are preferable. The approximate number of balls, n, per pound can be calculated from the expression $n=53/pd^2$, wherein p is the ball density given in grams per cubic centimeter and d is the ball diameter in inches. Thus, the number of porcelain balls of a certain size and density can be calculated per pound.

Ball mills are normally equipped with a manhole for loading the charge from the top which can be facilitated by a slope shoot that reaches from the storage area to the surface of the ball mill charge inside the mill, an air relief valve and a venting port for discharge. Venting should be carried out after starting a new batch and periodically as necessary as it contributes to grinding efficiency. Since the flowing material or moving machinery generates static electricity, it is desirable to have grounding at all points.

Although naturally occurring ceramic media such as flint pebbles (low density) are the oldest grinding material that is known, it is preferable to use the newer high density porcelain balls which have a high density. These are well known materials which are harder and more abrasion resistant than more conventional older porcelains and hence the wear on the ball is correspondingly less.

Metallic media are generally of a higher density than porcelain balls and therefor provide faster grinding at smaller ball diameters than their ceramic counterparts. This usually necessitates sturdier mill construction and higher power requirements. High carbon, high manganese steel balls having a Rockwell C hardness of 60 to 70 are commonly used for ball mill operations.

In selecting ball size, the smallest size should be selected which provides the proper cascading action inside the mill. It has been determined that once the ball size has been established for providing the best grinding action, it does not vary appreciably for different size mills. Thus, the ball size that proves successful on a small ball mill usually is also suitable to a scaled up production system. In general, balls of a minimum diameter and a maximum density are necessary to achieve the proper cascading action should be selected because per revolution of the mill they provide the maximum number of impact, colliding, or sheering contacts and for a given volume of space offer the maximum area for compressive action. Also, the smaller void spaces between the balls of lesser diameter effectively limits the size of the mill base agglomerates that can exist in the interstitial space.

It will be seen that depending upon the ball diameter and density, the most favorable conditions for grinding in a ball mill are tied in closely with the density and velocity of the mill base. In the difference between the ball and the mill base density, $\Delta p$ determines the actual force acting on the balls that causes them to cascade. The buoyant effect exerted by the mill base acting upwardly is proportional to the mill base density. The gravitational pull or weight of the ball charge acts downwardly and is proportional to the ball density. Hence it has been said that the overall or net force acting downward is proportional to the difference in the two densities and is given in the following equation: $\Delta p = p(ball) - p(mill\ base)$ While it has been suggested by some to use a mixture of small and large ball sizes in a ball mill operation, it has been found herein that it is desirable if the balls are of similar size.

When the charge is added to the ball mill ready for grinding, the metallic oxide proceeds to fill into the voids between the balls.

Taking into consideration that depending upon the ball shape and size, there can be a relatively tight packing of the balls or a relatively loose packing of the grinding medium. On an average, for a ideal situation assuming ideal charging conditions, the empty space in the ball mill should be about 50%, the ball volume occupying 30% of the remainder and the metallic oxides the remaining 20%. These are approximate and are not narrowly critical. It was established in general that by charging the ball mill to the halfway mark with balls, maximum grinding efficiency is obtained although that can vary as explained above.

If an amount of the metallic oxide is used that is greater than necessary to cover the balls in the ball mills (overpacking the chamber), the excess remains undisturbed with respect to the balls until such time as it has the opportunity to diffuse into and displace some of the metallic oxide base that is in the active ball region. This means that the operation is not being carried out under optimum conditions.

The difference between a ball mill vibrating in a horizontal mode and an attrition mill is well known. Whereas conventional ball milling is based on the cascading of the ball media in a horizontally mounted rotating drum, the attrition mills generally are upright, stationary, cylindrical grinding tanks fitted with a centralized vertical rotating shaft to which is attached at right angles a distribution of agitation members or metallic fingers. These extensions protrude into the ball media mill base mixture which partially fills the attritor tank during the milling operation. The rotation of these fingers which sweep through the tank contents vigorously agitates the ball charge which in turn provides the necessary shear and impact forces to grind the metallic oxide. The attritor mills can be designed for either batch or continuous operation. When properly functioning, the attritor mill also keeps all of the ball media in constant motion due to the rotation of the agitator fingers on the central shaft. Thus, in actual rotation the grinding media fluidizes and occupies a far greater percentage of the volume of the agitator than when the rotating blade is at rest. It is therefore essential that in a ball mill cascading action is obtained whereas in the attritor mill fluidization of the balls and agitating medium is necessary.

It is possible to use milling procedures which compact the metallic oxide which increase the bulk density without destructuring (see Tables 1 and 2).

In all cases, lowering the structure of pyrogenic metallic oxides is a function of:
1. the time of compression
2. the amount of compressive force exerted on the aggregates/agglomerate particles
3. the conditions of compression.

Destructuring takes place when these three facets of compression have been optimized. The destructuring process can be either continuous or batch. In all cases, destructuring is irreversible. Destructuring according to the present invention is achieved in a dry grinding process. As opposed to a wet grinding process, dry grinding is a more intense milling process which goes beyond standard particle size reduction to achieve destructuring of pyrogenic metallic oxides. Prior to the present invention, destructuring of pyrogenic metallic oxides has not been documented. In wet grinding, particles are surrounded by liquid (e.g., water or resin). Particle size is reduced with the milling energy generated by wet grinding; however, structure is much less influenced since the liquid acts like a cushion, thus metallic oxides can not be destructured effectively by wet grinding.

In addition to reducing the DBP absorption, the destructuring process of the present invention reduces agglomerate size measured by differential number % by Coulter® Laser Particle Size Analysis using optical model of Fraunhofer and increases bulk density measured in g/l. In general, destructuring according to the present invention achieves a 40% to 90% lowering of structure.

The present invention pertains to destructuring of all pyrogenic hydrophilic/hydrophobic metallic oxides with the following physical-chemical properties:

1. Pyrogenic Silicon Dioxide (hydrophilic & hydrophobic):

| | |
|---|---|
| BET -Surface Area $m^2/g$ (Micromeritics ® 2300) | 50–400 |
| Average Particle Size nm | 7–40 |
| Bulk Density g/l (DIN 53194) | 20–120 |
| Loss of Drying % (DIN 55921) | 0.5–2 |
| Loss of Ignition % (DIN 55921) | 1–10 |
| pH (DIN 53200) | 3–9 |
| DBP Absorption g/100 g (DIN 53601) | 150–450 |
| Carbon Content % | 0–5 |

Hydrophobizing agents for pyrogenic silicon dioxide include silane/organosilicon compounds (e.g., silicone oil, dimethyldichloro silane, hexamethyldisilizane, and others known to those skilled in the art) which consist of linear or cyclic organopolysiloxanes. The free valences of silicon not bonded to oxygen can be taken up by organic groups or hydrogen. For details of the hydrophobizing agents refer to U.S. Pat. No. 4,307,023 (which is incorporated by reference in its entirety, especially column 2, lines 5–30). Further details of the hydrophobizing process can be found in U.S. Pat. Nos. 3,924,029 and 4,503,092 (which are incorporated by reference in their entirety). U.S. Pat. No. 4,326,852 is also incorporated by reference in its entirety. The referenced patents illustrate hydrophobizing agents and methods for treating silica to render it hydrophobic.

2. Pyrogenic Aluminum Oxide:

| | |
|---|---|
| BET -Surface Area $m^2/g$ (Micromeritics ® 2300) | 80–120 |
| Average Particle Size nm | 10–15 |
| Bulk Density g/l (DIN 53194) | 40–120 |
| Loss of Drying % (DIN 55921) | 1–5 |
| Loss of Ignition % (DIN 55921) | 1–3 |
| pH (DIN 53200) | 4.5–5.5 |
| DBP Absorption g/100 g (DIN 53601) | 150–200 |

3. Pyrogenic cofumed mixed metallic oxides of above silicon dioxide products and aluminum oxide in ratios of 1–5% $Al_2O_3:SiO_2$.

4. Physical blends of pyrogenic metallic oxides of the above silicon dioxide products and aluminum oxide in ratios up to 20% $Al_2O_3:SiO_2$.

5. Pyrogenic Titanium dioxide:

| | |
|---|---|
| BET -Surface Area $m^2/g$ (Micromeritics ® 2300) | 30–100 |
| Average Particle Size nm | 15–30 |
| Bulk Density g/l (DIN 53194) | 40–120 |
| Loss of Drying % (DIN 55921) | 1–2 |
| Loss of Ignition % (DIN 55921) | 1–2 |
| pH (DIN 53200) | 3.0–4.0 |
| DBP Absorption g/100 g (DIN 53601) | 90–130 |

6. Pyrogenic Zirconium Oxide:

| | |
|---|---|
| BET -Surface Area $m^2/g$ (Micromeritics ® 2300) | 30–50 |
| Average Particle Size nm | 20–40 |
| Bulk Density g/l (DIN 53194) | 80–250 |
| Loss of Drying % (DIN 55921) | .1–1 |
| Loss of Ignition % (DIN 55921) | .1–1 |

-continued

| | |
|---|---|
| pH (DIN 53200) | 5.5–6.5 |
| DBP Absorption g/100 g (DIN 53601) | 120–150 |

Step 1. Production of Destructured Products

Trials were conducted with one pyrogenic hydrophilic silicon dioxide (Aerosil® 300), two hydrophobic pyrogenic silicon dioxide products (Aerosil® R972 & R810S), one pyrogenic aluminum oxide (Aluminum Oxide C), and one pyrogenic titanium dioxide (Titanium dioxide P-25). Aerosil® is a trademark of Degussa AG for its brand of pyrogenic silica. These are commercially available products with well documented properties and characteristics. 1000 grams of pyrogenic metallic oxide were charged (via a continuous gravity feed or one single charge) into an agitating media bed with a retention time of 15 seconds to 10 minutes for attrition process and 1–4 hours for batch roller mill process. After the destructuring procedure, the physical-chemical characteristics are as follows:

| | DBP Absorption (g/100 g) | Agglomerate Size (μ) | Bulk Density (g/l) |
|---|---|---|---|
| Aerosil ® 300 | | | |
| Before destructuring | 348 | 12.0 | 25 |
| After destructuring | 118 | 2.0 | 308 |
| Aerosil ® R972 | | | |
| Before destructuring | 269 | 9.0 | 30 |
| After destructuring | 70 | 5.0 | 308 |
| Aerosil ® R810S | | | |
| Before destructuring | 190 | 13.0 | 30 |
| After destructuring | 83 | 4.0 | 270 |
| $Al_2O_3C$ | | | |
| Before destructuring | 184 | 2.7 | 45 |
| After destructuring | 62 | 0.3 | 614 |
| $TiO_2$ P-25 | | | |
| Before destructuring | 97 | 0.6 | 117 |
| After destructuring | 57 | 0.2 | 525 |

The above data shows that the destructuring obtained was approximately 40% to 90%.

Destructuring is time/force related. Optimized conditions were defined as volume of ball mill-one gallon, charge of Aerosil 200VS-250 grams, charge of ceramic media (¼ inch spherical, density 2.8 g/cm³)-5000 grams, rpm of ball mill-90 rpm; samples were taken over several periods of time and the following destructuring under optimized conditions are achieved:

TABLE 1

| Aerosil 200 VS | DBP absorption g/100 g |
|---|---|
| no milling | 290 |
| 1 hour | 213 |
| 2 hours | 174 |
| 3 hours | 149 |
| 4 hours | 136 |

Examples where mechanical compaction does not destructure but where bulk density is increased are evident by comparing standard undensified grades of silica produced by Degussa AG, Aerosil® 200, 200 m²/g and Aerosil® 300, 300 m²/g to their densified counter parts:

TABLE 2

| | | Bulk Density g/l | DBP g/100 g |
|---|---|---|---|
| Aerosil ® | 200 | 20 | 309 |
| | 200 VS | 85 | 290 |
| Aerosil ® | 300 | 25 | 360 |
| | 300 VS | 90 | 350 |

For densification process, see U.S. Pat. Nos. 2,112,949; 2,844,459; and 4,877,595 (which are incorporated by reference in their entirety).

Non-optimized ball milling conditions, which do not significantly influence structure, are defined as volume of ball mill-one gallon, charge of Aerosil® 200–150 grams, charge of ceramic media (¼ inch spherical, density 2.8 g/cm³)-varied as indicated below, rpm of ball mill-90 rpm, time-varied as indicated below:

| Treatment | DBP g/100 g |
|---|---|
| no treatment (as is) | 321 |
| 250 g of media, milled 5 minutes | 324 |
| 350 g of media, milled 15 minutes | 310 |
| 650 g of media, milled 15 minutes | 307 |
| 1000 g of media, milled 15 minutes | 296 |

Step 2. Use of Destructured Products to Improve Extrusion Rate (ASTM C603)

Preblend 36 g of crosslinker {vinyl-tris-(methylethyl-ketoxime)silane} with 300 g of polydimethylsiloxane—silanol terminated resin (20,000 centistoke). Then add 30 g of pyrogenic metallic oxide into 336 g of resin+ crosslinker. (This mixture is part A).

Mix part A 20 minutes using high speed dispersion. While mixing part A, preblend dibutyl-tin dilaurate based catalyst with 1000 centistoke polydimethylsiloxane fluid. (This is part B.) Mix part B for 5 minutes under high speed dispersion. Then mix part A and B 5 minutes under high speed dispersion. Afterwards, mix additional 20 minutes under low speed. After dispersion, fill Semco® tubes and test extrusion rate according to ASTM C603. Extrusion rates of structured and destructured materials are as follows:

| | Extrusion Rate (g/min.) |
|---|---|
| Aerosil ® 300 | |
| Before destructuring | 306 |
| After destructuring | 578 |
| Aerosil ® R972 | |
| Before destructuring | 490 |
| After destructuring | 888 |
| Aerosil ® R810S | |
| Before destructuring | 526 |
| After destructuring | 834 |

Low structure is important to be able to load the polymer with larger amounts of filler. It enhances reinforcement and good flow properties of the polymer.

Step 3. Use of Destructured Products to Reduce Viscosity Measured by Brookfield®

Blend 10 parts pyrogenic metallic oxide (e.g., silica) with 100 parts 8000 centistoke polydimethyl-siloxane resin. Mix with high speed dispersion for 10 minutes. Allow to sit for 4 hours and measure viscosity with RVT Brookfield® viscometer with T-spindle at 20 rpm.

|  | Viscosity (cps) |
|---|---|
| Aerosil ® 300 | |
| Before destructuring | 10,000,000 |
| After destructuring | 17,500 |
| Aerosil ® R972 | |
| Before destructuring | 60,000 |
| After destructuring | 25,000 |
| Aerosil ® R810S | |
| Before destructuring | 30,000 |
| After destructuring | 26,000 |

Step 4. Hydrophobizing in-situ or as an After-treatment

During the destructuring process hydrophobized surfaces open up, exposing untreated internal surfaces. To fully hydrophobize these surfaces it is necessary to rehydrophobize during the destructuring process or an after-treatment once destructuring is completed. Any silane/siloxane treatments cited above for hydrophobizing of pyrogenic silicon dioxide can be utilized here.

Further variations and modifications of the foregoing will be apparent to those skilled in the art and such variations and modifications are attended to be encompassed by the claims that are appended hereto.

What is claimed:

1. A method of producing a low structure pyrogenic metal oxide filler comprising simultaneously reducing particle size/aggregate size and increasing bulk density by subjecting pyrogenically produced metal oxide agglomerates and aggregates selected from the group consisting of zirconium oxide, silicon dioxide, aluminum oxide, and titanium oxide to a dry milling process whereby the pyrogenically produced metal oxide is contacted in a agitating zone with an energy specific force created by the following conditions:

agitating media bed consisting of a member selected from the group consisting of stainless steel, chrome steel, carbon steel, ceramic, aluminum oxide, tungsten carbide, zirconium carbide, zirconium oxide, and zirconium silicate whereby the metallic oxide agglomerates and aggregates are free to move, collide and impinge on each other, wherein the media is kept in constant agitation by a rotating shaft with protruding extensions of a length or by a rolling drum, the media diameter being 0.04 to one inch in diameter and being of circular, spherical or cylindrical shape, the shaft speed being between 100 and 1500 rpm or the roller drum speed being between 30 to 120 rpm, wherein the media fills the volume of the agitating zone to the extent of ¼ to ¾ of its total volume and wherein the dwell time in the zone is controlled by the amount of time the metallic oxide remains in the media bed or by the number of passes through the media bed, evaluating the resulting product until a steady state condition is reached and wherein the lowering of the structure of the pyrogenic metallic oxide is a function of the time of compression, the amount of compressive force exerted on the aggregate/agglomerate particles and the conditions of compression.

2. The method according to claim 1 wherein the metallic oxide is pyrogenic silicon dioxide having the following characteristics:

| BET -Surface Area m$^2$/g | 50–400 |
|---|---|
| Average Particle Size nm | 7–40 |
| Bulk Density g/l (DIN 53194) | 20–120 |
| Loss of Drying % (DIN 55921) | 0.5–2 |
| Loss of Ignition % (DIN 55921) | 1–10 |
| pH (DIN 53200) | 3–9 |
| DBP Absorption g/100 g (DIN 53601) | 150–450 |
| Carbon Content % | 0–5. |

3. The method according to claim 1 wherein the metallic oxide is pyrogenic aluminum oxide having the following characteristics:

| BET -Surface Area m$^2$/g | 80–120 |
|---|---|
| Average Particle Size nm | 10–15 |
| Bulk Density g/l (DIN 53194) | 40–120 |
| Loss of Drying % (DIN 55921) | 1–5 |
| Loss of Ignition % (DIN 55921) | 1–3 |
| pH (DIN 53200) | 4.5–5.5 |
| DBP Absorption g/100 g (DIN 53601) | 150–200. |

4. The method according to claim 1 wherein the metallic oxide is a pyrogenic cofumed mixed metallic oxide of silicon dioxide and aluminum oxide in a ratio of 1–5% $Al_2O_3$:$SiO_2$.

5. The method according to claim 1 wherein the metallic oxide is a physical blend of pyrogenic metallic oxides of silicon dioxide and aluminum oxide in a ratio up to 20% $Al_2O_3$:$SiO_2$.

6. The method according to claim 1 wherein the metallic oxide is pyrogenic titanium oxide having the following characteristics:

| BET -Surface Area m$^2$/g | 30–100 |
|---|---|
| Average Particle Size nm | 15–30 |
| Bulk Density g/l (DIN 53194) | 40–120 |
| Loss of Drying % (DIN 55921) | 1–2 |
| Loss of Ignition % (DIN 55921) | 1–2 |
| pH (DIN 53200) | 3.0–4.0 |
| DBP Absorption g/100 g (DIN 53601) | 90–130. |

7. The method according to claim 1 wherein the metallic oxide is pyrogenic zirconium oxide having the following characteristics:

| BET -Surface Area m$^2$/g | 30–50 |
|---|---|
| Average Particle Size nm | 20–40 |
| Bulk Density g/l (DIN 53194) | 80–250 |
| Loss of Drying % (DIN 55921) | .1–1 |
| Loss of Ignition % (DIN 55921) | .1–1 |
| pH (DIN 53200) | 5.5–6.5 |
| DBP Absorption g/100 g (DIN 53601) | 120–150. |

8. A method of using the low structure pyrogenic metallic oxide according to claim 1 comprising incorporating a sufficient amount of said metallic oxide to function as a reinforcing filler in a silicon or non-silicon based rubber, sealant, caulk or adhesive composition.

9. A low structure pyrogenic metal oxide filler or carrier produced by the method according to claim 1.

10. A polymeric composition comprising a silicone or non-silicone based polymeric containing as a reinforcing filler a sufficient amount of the filler produced according to the method of claim 1.

11. The polymeric composition according to claim 10 which is a rubber, sealant, caulk or adhesive composition.

12. A rubber composition comprising a silicone or non-silicone based rubber containing as a reinforcing filler a sufficient amount of the filler produced according to the method of claim 1.

13. A sealant composition comprising a silicone or non-silicone based sealant containing as a reinforcing filler a sufficient amount of the filler produced according to the method of claim 1.

14. A caulk composition comprising a silicone or non-silicone based caulk containing as a reinforcing filler a sufficient amount of the filler produced according to the method of claim 1.

15. An adhesive composition comprising a silicone or non-silicone based adhesive containing as a reinforcing filler a sufficient amount of the filler produced according to the method of claim 1.

16. A method of producing a low structure pyrogenic metal oxide filler, said method consisting essentially of simultaneously reducing particle size/aggregate size and increasing bulk density by subjecting pyrogenically produced metal oxide agglomerates and aggregates selected from the group consisting of zirconium oxide, silicon dioxide, aluminum oxide, and titanium oxide to a dry milling process whereby the pyrogenically produced metal oxide is contacted in a agitating zone with an energy specific force created by the following conditions: agitating media bed consisting of a member selected from the group consisting of stainless steel, chrome steel, carbon steel, ceramic, aluminum oxide, tungsten carbide, zirconium carbide, zirconium oxide, and zirconium silicate whereby the metallic oxide agglomerates and aggregates are free to move, collide and impinge on each other, wherein the media is kept in constant agitation by a rotating shaft with protruding extensions of a length or by a rolling drum, the media diameter being 0.04 to one inch in diameter and being of circular, spherical or cylindrical shape, the shaft speed being between 100 and 1500 rpm or the roller drum speed being between 30 to 120 rpm, wherein the media fills the volume of the agitating zone to the extent of ¼ to ¾ of its total volume and wherein the dwell time in the zone is controlled by the amount of time the metallic oxide remains in the media bed or by the number of passes through the media bed, evaluating the resulting product until a steady state condition is reached and wherein the lowering of the structure of the pyrogenic metallic oxide is a function of the time of compression, the amount of compressive force exerted on the aggregate/agglomerate particles and the conditions of compression.

\* \* \* \* \*